(12) United States Patent
Wang

(10) Patent No.: US 11,399,094 B1
(45) Date of Patent: Jul. 26, 2022

(54) METHOD, SYSTEM AND DEVICE FOR PERMITTING UNFAMILIAR CALL

(71) Applicant: Zhenkun Wang, Marblehead, MA (US)

(72) Inventor: Zhenkun Wang, Marblehead, MA (US)

(*) Notice: Subject to any disclaimer, the term of this patent is extended or adjusted under 35 U.S.C. 154(b) by 0 days.

(21) Appl. No.: 17/338,177

(22) Filed: Jun. 3, 2021

(51) Int. Cl.
| | |
|---|---|
| *H04M 3/436* | (2006.01) |
| *H04M 3/493* | (2006.01) |
| *H04M 3/51* | (2006.01) |
| *H04M 3/533* | (2006.01) |

(52) U.S. Cl.
CPC ....... *H04M 3/4365* (2013.01); *H04M 3/4936* (2013.01); *H04M 3/5116* (2013.01); *H04M 3/5335* (2013.01); *H04M 2201/40* (2013.01)

(58) Field of Classification Search
None
See application file for complete search history.

(56) References Cited

U.S. PATENT DOCUMENTS

| | | | | |
|---|---|---|---|---|
| 5,199,062 A | * | 3/1993 | Von Meister | H04M 3/44 370/259 |
| 5,467,388 A | * | 11/1995 | Redd, Jr. | H04M 1/663 379/210.02 |
| 9,226,159 B1 | * | 12/2015 | Cao | H04W 12/12 |
| 10,951,756 B1 | * | 3/2021 | Silverstein | H04M 3/42161 |
| 2005/0190744 A1 | * | 9/2005 | Sun | H04L 51/04 370/352 |

* cited by examiner

*Primary Examiner* — Hemant S Patel
(74) *Attorney, Agent, or Firm* — WPAT, PC

(57) ABSTRACT

A method for permitting unfamiliar call, applied to a communication device having a memory and a call-blocking app to provide an unfamiliar call, includes the steps of: configuring an area in the memory of the communication device as a storage unit; recording at least one password into a password-correlated table in the storage unit, each of the at least one password being related to a specific user of the communication device; as an unfamiliar call is received, asking a caller of the unfamiliar call to provide an answer for a trivial question immediately provided by the communication device; determining whether or not the answer matches any of the at least one password in the password-correlated table; forwarding the unfamiliar call to the user corresponding to the matched password listed in the password-correlated table if positive; and, blocking the unfamiliar call if negative.

17 Claims, 8 Drawing Sheets

| Column 1 | Column 2 |
|---|---|
| Go bears | King Justin |
| Beat cal | Master Steve |
| California | King Justin |
| 54088 (tones) | King Justin |
| Phd., the fake | I.W. Tsai |
| 0800 (tones) | Hitchcook |
| Channel 5 | Anna |

FIG. 4

METHOD, SYSTEM AND DEVICE FOR PERMITTING UNFAMILIAR CALL

TECHNICAL FIELD

The present disclosure relates in general to a communication means for managing incoming calls, and more particularly to a method, a system and a device for permitting an unfamiliar call by verifying an uncorrelated password.

BACKGROUND

According to a 2018 report by the Federal Communications Commission and Federal Trade Commission, unsolicited robocalls are the #1 source of reported consumer complaints in the U.S. This incessant problem is only getting worse due to booming business activities and also due to a lucrative profit motive. Even more seriously, with popularity of mobile communication products, beside the increase in the robocalls, the number of spam calls, nuisance calls, telemarketers, fraud calls, scam calls and unknown calls are increased as well. Such a trend in the mobile communication does cause troublesome problems to the users. In this disclosure, all the robocalls, spam calls, nuisance calls, telemarketers, fraud calls and scam calls are interpreted as "unwanted calls".

To lessen the aforesaid disturbing situations, various applications in blocking foregoing unwanted calls are introduced, such as Whoscall, Truecaller and Call Protect. Generally, in any of these call-blocking apps, any incoming call is processed firstly to determine whether or not it belongs to the groups of unwanted calls, usually defined in advanced by the user. If positive, then the call will be blocked by the call-blocking app without ringing the user.

However, deficiency in handling unfamiliar phone numbers does exist in these call-blocking apps. If the call-blocking app is set to block all the unfamiliar calls, then it can be expected that the user of the phone installed with the call-blocking app can only communicate, talk or socialize with friends in his or her contact list. Obviously, such a manner in handling the unfamiliar calls is definitely harmful to user's social or business life. On the other hand, if the call-blocking app is set to allow all the unfamiliar calls, then it is foreseen that the telemarketers and some nuisance calls would keep ringing the user of the phone.

Nevertheless, some unfamiliar calls may provide potential business or social benefits. For example, the unfamiliar call may come from an old friend with a new phone number, a new friend met in an exhibition event, a headhunter or any the like. In other words, using the current call-blocking apps to handle the unfamiliar calls might not meet the best interest of the user.

Thus, to provide a mechanism that can further screen the unfamiliar calls filtered by the existing call-blocking apps or services, not just block all of them, is definitely welcome and required in the art.

SUMMARY

An object of the present disclosure is to provide a method, system and device for permitting unfamiliar call to a communication device that can further screen the unfamiliar calls blocked by the call-blocking apps or services for the mobile communication device so as to simultaneously permit a specific call thereof that is made by a specific expected caller. In this disclosure, the method for permitting unfamiliar call utilizes a preset trivial question to interrogate each of the callers of the unfamiliar calls firstly, and then determines allowance of the unfamiliar call by judging whether or not an answer provided by the caller can match a specific answer predetermined by the user of the mobile communication device. In particular, the specific answer or password in this method may be uncorrelated in meaning to the preset trivial question.

In one aspect of this disclosure, a method for permitting unfamiliar call, applied to a communication device having a memory and a call-blocking app to provide an unfamiliar call, includes: a step of configuring an area in the memory of the communication device as a storage unit; a step of recording at least one password into a password-correlated table in the storage unit, each of the at least one password being related to a specific user of the communication device; a step of, as an unfamiliar call is received, asking a caller of the unfamiliar call to provide an answer for a trivial question immediately provided by the communication device; a step of determining whether or not the answer matches any of the at least one password in the password-correlated table; a step of forwarding the unfamiliar call to the user corresponding to the matched password listed in the password-correlated table if positive; and, a step of blocking the unfamiliar call if negative.

The instant invention discloses a method for filtering an incoming call to a communication device, comprising steps of: (a) recording at least one password into a password-correlated table in a computer readable storage medium, and recording call information into a call-list table; (b) asking a caller of said incoming call, by a trivial-question circuit, to provide an answer for a trivial question; (c) determining by said trivial-question circuit whether said answer matches said at least one password in said password-correlated table; and (d) connecting said incoming call by said trivial-question circuit if said answer matches said at least one password, or disconnecting said incoming call if said answer does not match said at least one password.

In one embodiment of this disclosure, the at least one password is in a form of a voice message with specific wording.

In one embodiment of this disclosure, the at least one password is in a form of a combination of dial tones.

In one embodiment of this disclosure, the trivial question is in a form of a voice message.

In one embodiment of this disclosure, the method further generates a block message having a number of the unfamiliar call provided to the communication device if the unfamiliar call does not match the at least one password.

In one embodiment of this disclosure, the method for permitting unfamiliar call is in a form of an application program furnished with an interrogation control unit to configure the password-correlated table in the memory of the communication device and to execute the method.

In another aspect of this disclosure, a mobile communication device includes a call-blocking app, a memory and an application program. The call-blocking app is used for screening incoming calls and further classifying any of the incoming calls as an unfamiliar call. The memory has a storage unit for storing a password-correlated table, and the password-correlated table has at least one password. The application program is used for configuring the password-correlated table into the memory and for performing a method including steps of: asking a caller of the unfamiliar call to provide an answer for a trivial question, determining whether or not the answer matches the at least one password in the password-correlated table, connecting the unfamiliar call if the at least one password is matched, and blocking the unfamiliar call if the answer does not match the at least one password.

In a further aspect of this disclosure, a communication system includes a communication server and a plurality of communication terminals. The communication server further includes a call-blocking app, a memory and an application program. The call-blocking app is used for screening incoming calls and further classifying any of the incoming calls as an unfamiliar call. The memory has a storage unit for storing a password-correlated table, and the password-correlated table has a plurality of passwords and a plurality of users corresponding to the plurality of passwords. The application program is used for configuring the password-correlated table into the storage unit and for performing a method including steps of: asking a caller of the unfamiliar call to provide an answer for a trivial question, determining whether or not the answer matches one of the plurality of passwords in the password-correlated table, connecting the unfamiliar call to one of the plurality of users corresponding to the one of the plurality of passwords in the password-correlated table that matches the answer, and blocking the unfamiliar call if the answer does not match all of the plurality of passwords. Each of the plurality of communication terminals is corresponding to one of the plurality of users.

In one embodiment of this disclosure, at least one of the plurality of communication terminals is a mobile phone.

In one embodiment of this disclosure, at least one of the plurality of communication terminals is a desk-top phone set.

As stated, in the method, system and device for permitting unfamiliar call to a mobile communication device or a communication server, the unfamiliar calls determined by the call-blocking apps or services can be further screened, such that unexpected callers will be blocked from bothering users of the device or the users, but valuable callers would be permitted through the specific interrogation process. Since the passwords for permitting the unfamiliar calls utilizes a preset trivial are preset by the user of the communication device, thus the unfamiliar callers to be permitted can be determined or selected in advance through revealing the passwords to the specific persons or party.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 4 demonstrates schematically an exemplary example of a password-correlated table stored in a memory of a communication server of the communication system of FIG. 3.

DETAILED DESCRIPTION

Figure 1:
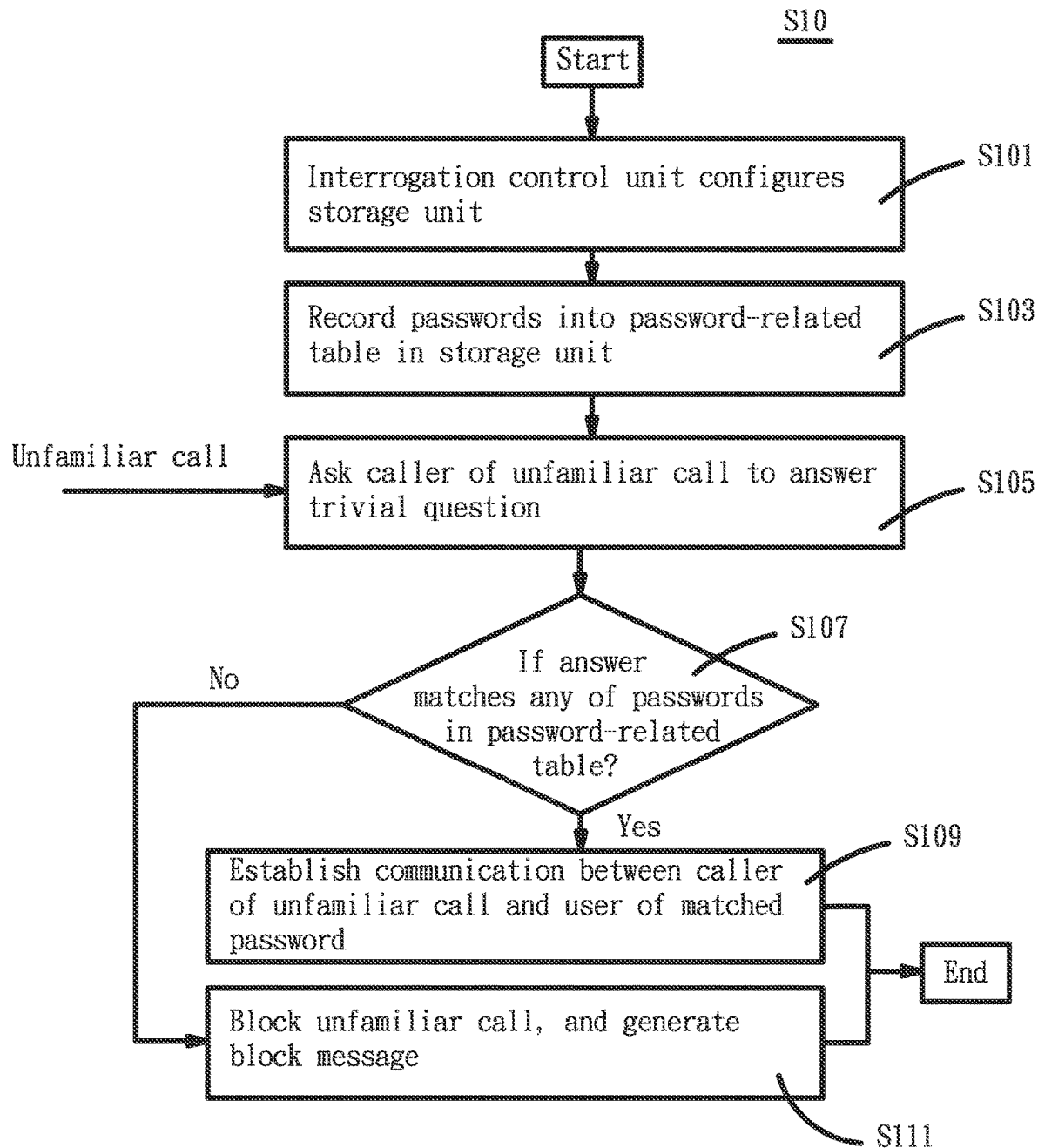
FIG. 1 is a schematic flowchart of an embodiment of the method for permitting unfamiliar call in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It should be understood firstly that, in this disclosure, unfamiliar calls are defined and provided by an existing call-blocking process for a mobile communication device or a communication server. Such a call-blocking process can be provided by the manufacturer of the mobile communication device itself, an application program (app) downloaded or builtin already in the mobile communication device or the communication server for handling incoming calls, and any the like.

Referring to FIG. 1, a flowchart for an embodiment of the method S10 for permitting unfamiliar call in accordance with this disclosure is schematically shown. Preferably, the method S10 can be presented as an application program (app-S10) downloaded from a local network or the Internet, and the app-S10 is also furnished with an interrogation-control circuit as an executive program to perform the method S10. The S10 can be either executed on either the communication device or the network server. In this embodiment, the method S10 includes at least the steps as follows.

Step S101: The interrogation-control circuit configures a specific area in a memory of the communication device as a storage unit for the app-S10.

Step S103: At least one message with specific wording or a combination of specific dial tones as one of passwords of the method is recorded into a password-correlated table in the storage unit. In the password-correlated table, each of the passwords is related to a specific user of the communication device.

Step S105: A caller of an unfamiliar call is asked to provide an answer for a trivial question immediately provided by the communication device. According to this disclosure, the communication device has been installed with a call-blocking process for recognizing the unfamiliar call from the incoming call, and the recognized unfamiliar call is then forwarded immediately to this Step S105 for processing the interrogation by the trivial question. Preferably, the trivial question is presented as a voice message.

Step S107: It is determined by the interrogation-control circuit whether or not the answer matches any of the passwords pre-stored in the password-correlated table in the storage unit. If positive, then the unfamiliar call is forwarded to the user corresponding to the matched password listed in the password-correlated table (i.e., go to Step S109). If negative, then go to Step S111.

Step S109: The interrogation-control circuit establishes a communication connection between the caller of the unfamiliar call and the user related to the matched password.

Step S111: The unfamiliar call is blocked by the interrogation-control circuit, and preferably a corresponding block message having a number of the unfamiliar call is provided to the user of the communication device.

In this embodiment, the trivial question can be a voice message recorded also in the storage unit. According to this disclosure, the trivial question can be revised periodically or kept the same all the time, but the password for the specific user can be revised arbitrarily by the user. Basically, the password is logically independent to the trivial question. Thus, the trivial question provided by the communication device can present no difference to all incoming unfamiliar calls, but the passwords can be different from time to time, depending on user's determination. As such, the unfamiliar calls to be permitted by the method S10 can be controlled by the user. Namely, the user can determine or select the permitted unfamiliar caller through revealing the password in advance to the specific party.

In one embodiment of this disclosure, the aforesaid communication device is a mobile communication device such as a smart phone or pad. Namely, the app-S10 is installed in the mobile communication device for performing the method S10.

Figure 2:
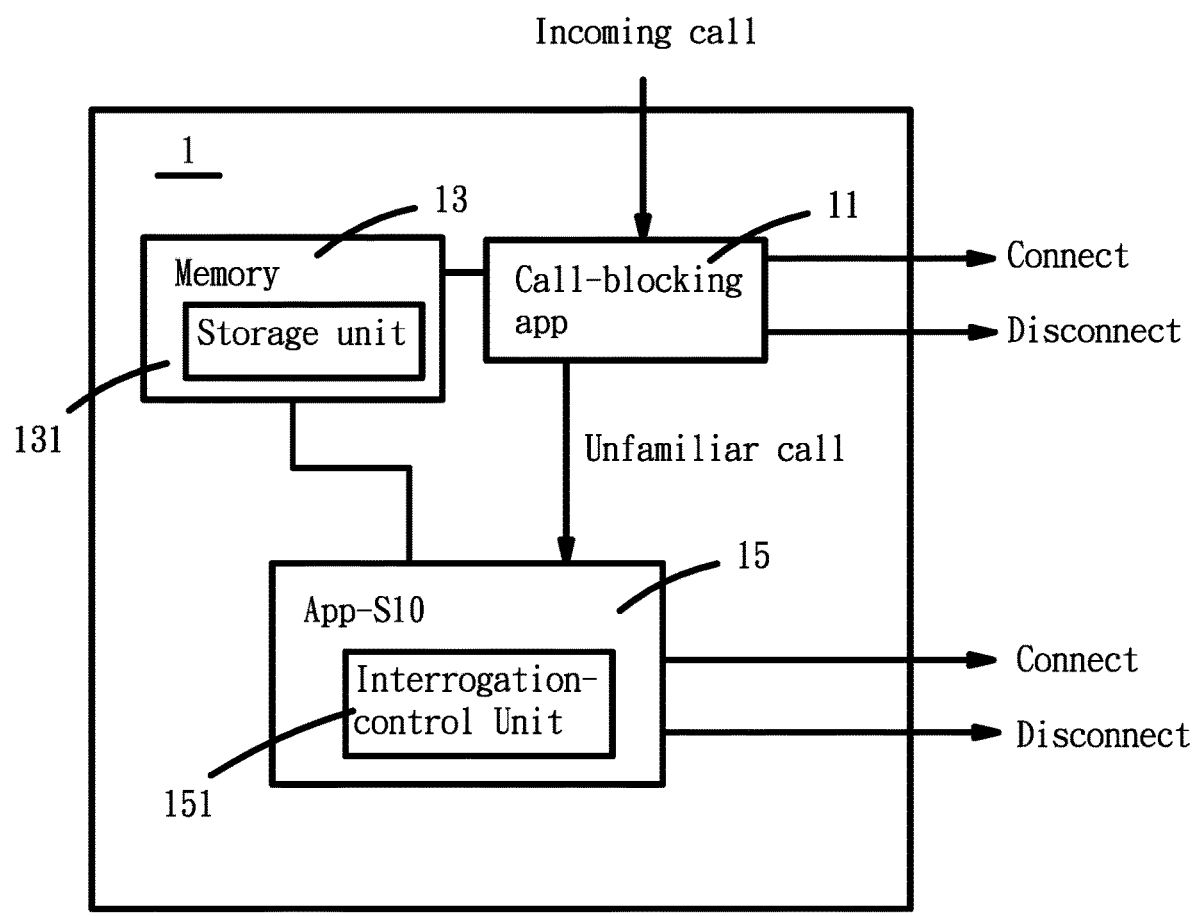
FIG. 2 is a schematic view of an embodiment of a mobile communication device for applying the method for permitting unfamiliar call in accordance with this disclosure.

Referring to FIG. 2, a schematic view of an embodiment of a mobile communication device for applying the method for permitting unfamiliar call in accordance with this disclosure is shown. In this embodiment, the mobile communication device 1, as an exemplary example of the aforesaid communication device mentioned in the the method S10, includes a call-blocking app 11 for screening the incoming call and further classifying the incoming call as an unfamiliar call, a memory 13 having a storage unit 131 for storing a password-correlated table, and an app-S10 15 for receiving the unfamiliar call and having an interrogation control unit 151 for performing the method S10.

As a call is made to reach the mobile communication device 1, the call-blocking app 11 would be activated to recognize if or not the instant call is an unwanted call such as a robocall, a spam call, a nuisance call, a telemarketer, a fraud call and a scam call, an emergency call, a friendly call in the contact list of the mobile communication device 1, or an unfamiliar call who carries a phone number but is not entitled to any of the foregoing groups. Generally, in the art, the call-blocking app 11 would block the unwanted call directly and automatically, allow the emergency or friendly call to go through and ring the user, and allow or block the unfamiliar call in accordance with the setting of the call-blocking app 11. According to this disclosure, in order to have the app-S10 15 to process the unfamiliar call, the call-blocking app 11 is set to transfer the unfamiliar call to the app-S10 15.

Upon receiving the unfamiliar call, the app-S10 15 would process the unfamiliar call by executing the method S10, initially from Step S105 thereof. Namely, the caller of the unfamiliar call would be requested to answer a trivial question broadcast by the app-S10 15. If an answer provided by the caller of the unfamiliar call is determined to match the recorded answer by the interrogation control unit 151, then the unfamiliar call would be permitted to ring the user. On the other hand, if the answer provided by the caller does not match the recorded answer or any of thee recorded answers, then the interrogation control unit 151 would block the unfamiliar call, and preferably generate a corresponding bock message having a number of the unfamiliar call to notify the user of the mobile communication device 1.

According to this disclosure, the trivial question can be meaningful or meaningless, and the answer (i.e., the password) can be related or unrelated to the trivial question. For example, the trivial question can be always the question "What is the answer?", and the answer recorded in the storage unit 131 of the memory 13 of the mobile communication device 1 by the user thereof can be the voice message "Go bears". In addition, both the trivial question and the answer are pre-recorded into the storage unit 131, and both of them are changeable. In particular, if a new password is recorded into the storage unit 131, then the validity of the old password is predetermined by the user. In this embodiment, the app-S10 15 can be set to accept only the new password, only the last two passwords, or all the recorded password.

Figure 3:
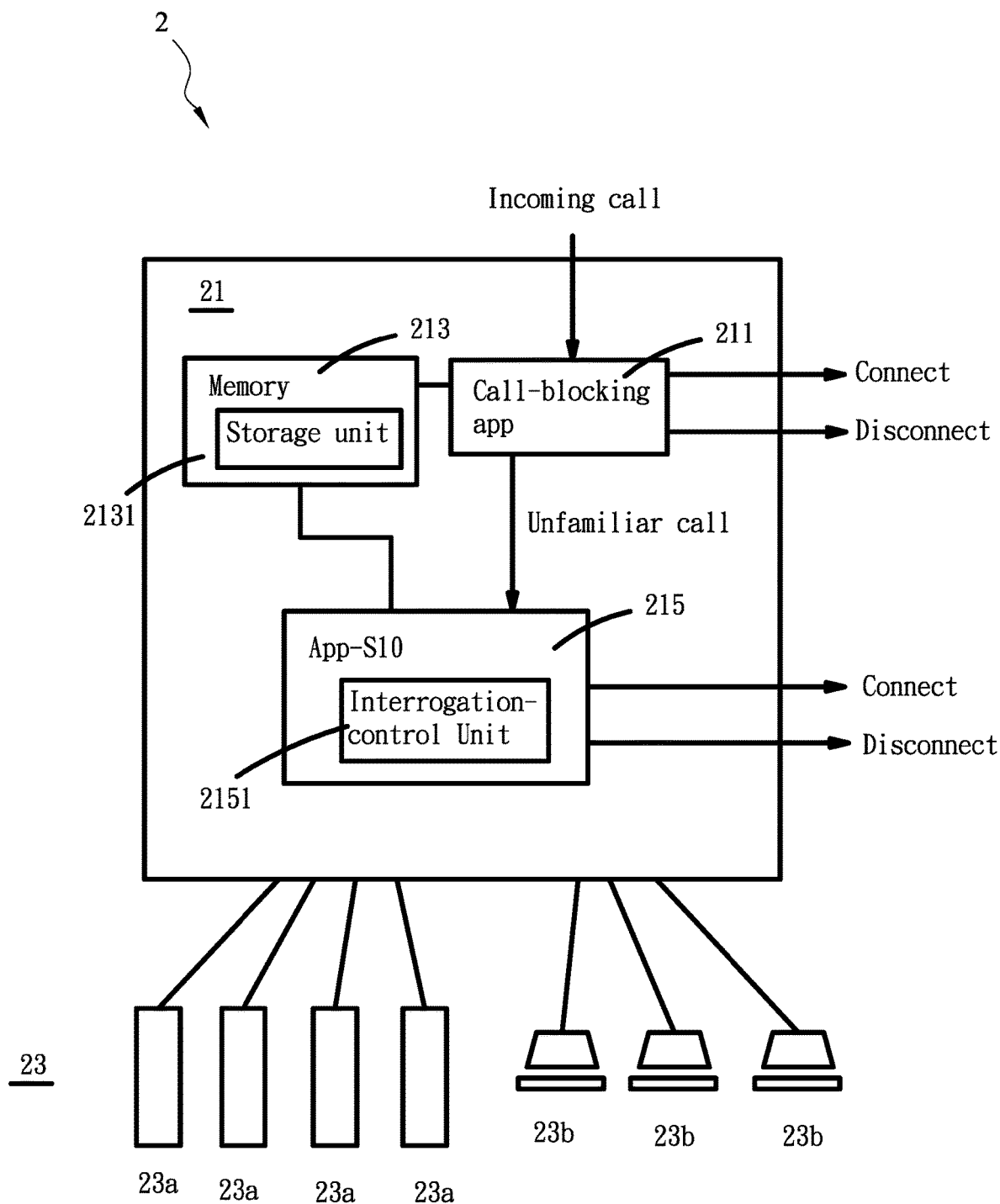
FIG. 3 is a schematic view of an embodiment of a communication system for applying the method for permitting unfamiliar call in accordance with this disclosure.

Referring to FIG. 3, a schematic view of an embodiment of a communication system for applying the method for permitting unfamiliar call in accordance with this disclosure is shown. In this embodiment, the communication system 2 includes a communication server 21 and a plurality of communication terminals 23. The communication server 21, as another exemplary example of the aforesaid communication device mentioned in the the method S10, includes a call-blocking app 211 for screening the incoming call and further classifying the incoming call as an unfamiliar call, a memory 213 having a storage unit 2131 for storing a password-correlated table, and an app-S10 215 for receiving the unfamiliar call and having an interrogation control unit 2151 for performing the method S10. The plurality of communication terminals 23 can include mobile phones 23*a* and desk-top phone sets 23*b*, and each of the mobile phones 23*a* and the desk-top phone sets 23*b* are signally connected with the communication server 21, in a wireless or cable manner.

In this communication system 2, individual users of the mobile phones 23*a* and the desk-top phone sets 23*b* shall record respective passwords of the corresponding communication terminals 23 into the password-correlated table of the storage unit 2131. In FIG. 4, a typical example of the password-correlated table stored in the memory 213 of a communication server 21 of the communication system 2 of FIG. 3 is schematically shown. According to this embodiment, the password-correlated table shall have at least two columns Entries of the first column are passwords for permitting the unfamiliar calls, and entries of the second column are the specific communication terminals 23 corresponding to the passwords listed in the first column thereof. It is noted that, in this example of the password-correlated table, different passwords may be mapped to the same communication terminal 23. For example, passwords "Go bears", "California", and "54088 (dial tones)" are all directed to the same communication terminal named "King Justin". It implies that the user "King Justin" has revealed different passwords to people, and he chooses to keep all these passwords active to receive the unfamiliar calls.

In this communication system 2, as a call is received, the call-blocking app 211 of the communication server 21 would be activated to recognize if or not the instant call is an unwanted call such as a robocall, a spam call, a nuisance call, a telemarketer, a fraud call and a scam call, an emergency call, a friendly call in the contact list collected by the communication system 2, or an unfamiliar call who carries a phone number but is not entitled to any of the foregoing groups. Generally, in the art, the call-blocking app 211 would block the unwanted call directly and automatically, allow the emergency or friendly call to go through and ring the user, and allow or block the unfamiliar call in accordance with the setting of the call-blocking app 211. According to this disclosure, in order to have the app-S10 215 to process the unfamiliar call, the call-blocking app 211 is set to transfer the unfamiliar call to the app-S10 215.

Upon receiving the unfamiliar call, the app-S10 215 would process the unfamiliar call by executing the method S10, initially from Step S105 thereof. Namely, the caller of the unfamiliar call would be requested to answer a trivial question broadcast by the app-S10 215. If an answer provided by the caller of the unfamiliar call is determined to match any of the recorded passwords in the first column of the password-correlated table by the interrogation control unit 2151, then the unfamiliar call would be directed immediately to the corresponding user listed in the second column of the password-correlated table. On the other hand, if the answer provided by the caller does not match all the recorded passwords in the first column of the password-correlated table, then the interrogation control unit 2151 would block the unfamiliar call, and preferably generate a corresponding bock message having a number of the unfamiliar call to notify related personnel of the communication system 2.

Similarly, in this embodiment, the trivial question broadcast by the communication server 21 can be meaningful or meaningless, and the passwords set by different users can be related or unrelated to the trivial question. For example, the trivial question can be always the question "What is the answer?", and the passwords recorded in the storage unit 2131 of the memory 213 of the communication server 21 by different users thereof can be voice messages such as "Go bears", "California", "Beat Cal" and "Channel 5", or dial tones "54088" and "0800". In addition, both the trivial question and any of the passwords are pre-recorded into the storage unit 2131, and both of them are changeable. In particular, if a new password is recorded into the storage unit 2131, then the validity of the old passwords is predetermined by the user. For example, as shown in FIG. 4, "King Justin" keeps several passwords to be active, but "Master Steve" sets active to only one updated password.

Figure 5:
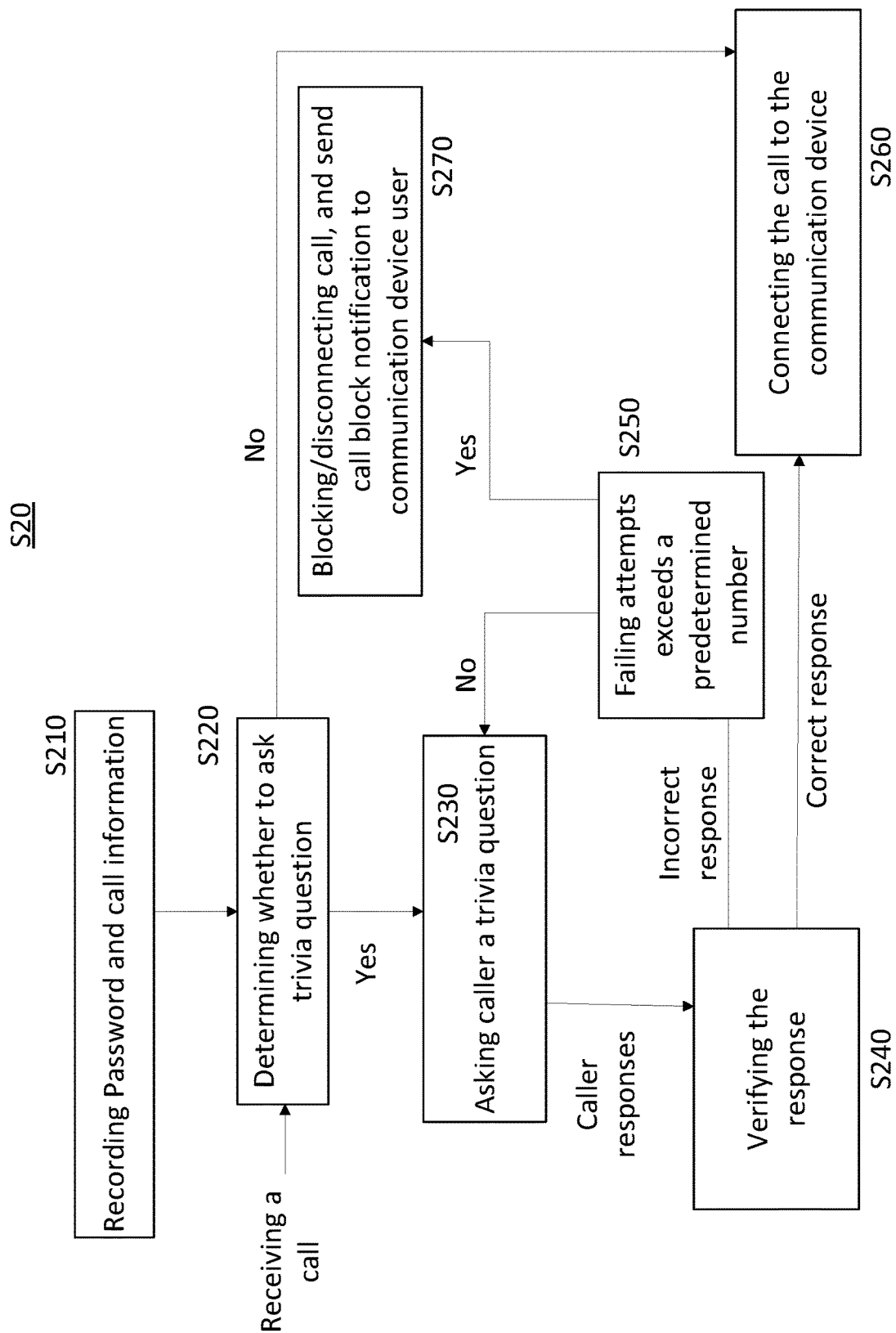
FIG. 5 is a schematic flowchart of an embodiment of the method for connecting or disconnecting incoming calls in accordance with this disclosure.

Referring to FIG. 5, a flowchart for an embodiment of the method S20, similar to S10 for connecting or disconnecting incoming calls in accordance with this disclosure is schematically shown. Preferably, the method S20 can be presented as an application program (app-S10) downloaded from a local network or the Internet, and the app-S20 is also furnished with an interrogation-control circuit as an executive program to perform the method S20. The S20 can be either executed on either the communication device or the network server. In this embodiment, the method S20 includes at least the steps as follows.

Step S210: The interrogation-control circuit configures a specific area in a memory of the communication device or the network server as a storage unit for the app-S20, and recording at least one message with specific wording or a combination of specific dial tones as one of passwords into a password-correlated table in the storage unit. In the password-correlated table, each of the passwords is related to a specific incoming caller or a group of callers; each of the passwords may also related to a trivial question.

Step S220: when a call is received, the trivial-question circuit determines whether the caller is identified as familiar caller which does not require password. The familiar callers can be members of the phone books or selected callers previously specified by the communication device owner. This feature can also be an option that communication device owner can turn off. Once the caller is identified as a familiar, the system will connect the call at the S260, otherwise the system will proceed to S230.

Step S230: The trivial-question circuit will prompt caller a trivial question. The trivial question can be caller specific or caller group specific. For instance, a trivial question for a specific member in the phone book, and another trivial question for everyone in public. The communication device owner can provide general public his/her numbers along with the answer, such as particular extension number or personal information as the answer. The caller can enter the answer either via voice or dial tone.

Figure 6:
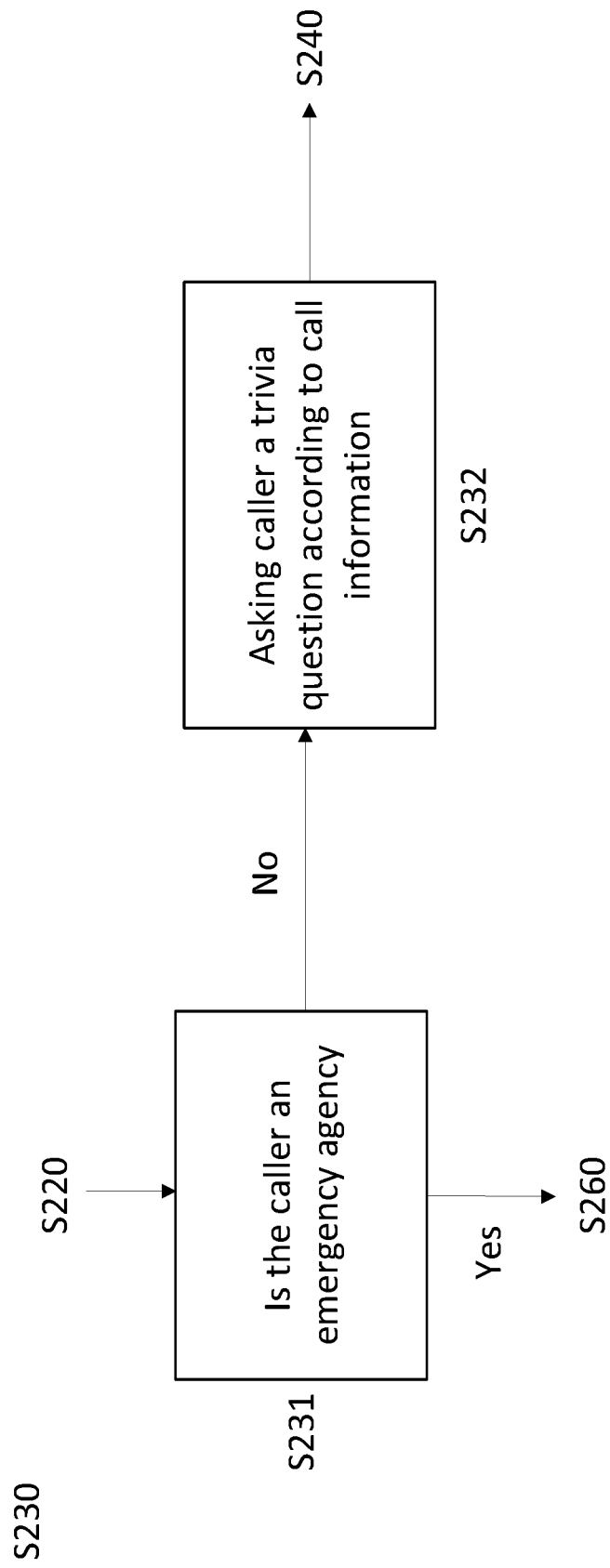
FIG. 6 is a flow chart for the step S230 of FIG. 5.

Referring to FIG. 6, a flowchart for an option of the S230. Before the trivial-question circuit prompts the caller the trivial question, at Step 231, the circuit will determine whether the caller is identified as an emergency agency. If the caller is an emergency agency, the circuit will skip the trivial question and connects the call directly at S260, otherwise, the circuit will proceed with the trivial question at the Step S232.

Step S240: The call-blocking circuit determines whether the answer provided is correct. The call-blocking circuit will connect the call once the correct answer is provided. If the answer is incorrect, the call block will determines whether to disconnect the calls or have the caller to try it again.

Figure 7:
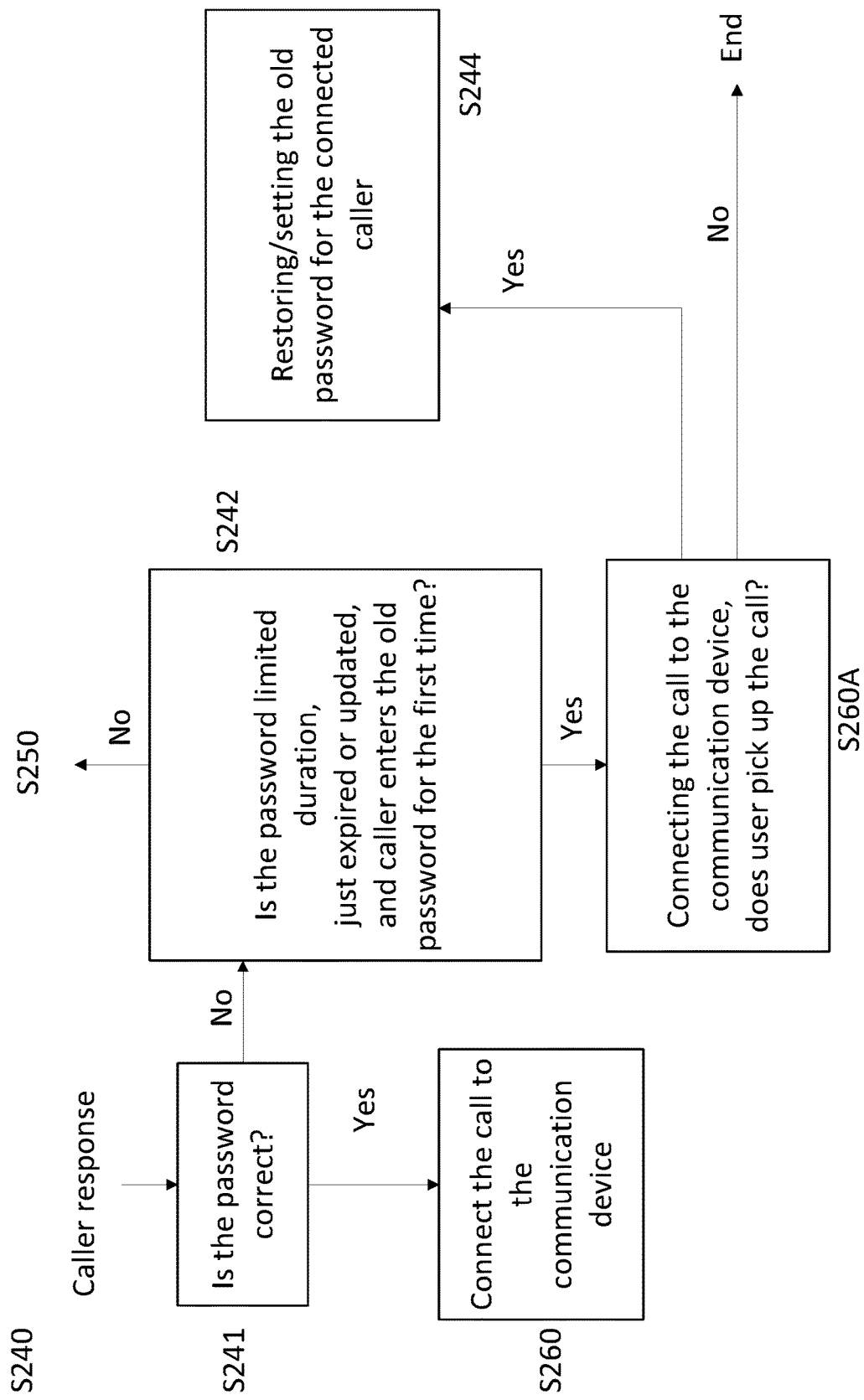
FIG. 7 is a flow chart for the step S240 of FIG. 5.

Referring to FIG. 7, a flowchart for an option of the S240. At Step S241, upon receiving the answer from the caller, the call-blocking circuit determines whether the received answer is correct. The circuit connects the call at Step 260 when the answer is correct. If the answer is not correct, it proceeds to step S242. Step S242 determines whether the password has just been updated due to its preset expiration, and whether the caller entered the old password as the first time after the password was updated. The instant invention provides that the password can have a duration limitation. Mainly the limited duration password is for the general public, a group of selected members, or a general trivial question.

As the password expired and either caller does not have the newly updated password or the password has not been updated/renewal, the system can identify these callers and block them. However, if the caller enters the previous password for the very first time after the password is updated or expired, the system will provisionally connect the caller at the Step S260A. At the Step S260A, it is the call receiver's decision whether to pick up the call. If call receiver does decide to pick up the call, the system will proceed to Step S244 to restore/set the old password for this particular caller for future calls.

Further, before provisionally connecting the incoming call, the call-blocking circuit can put the incoming call on hold for a predetermined period of time. Such holding time can further deter any unwanted caller who has the old password. In addition, the call-blocking circuit can also ask a simple question to verify whether the caller is automatically dialed by a market system or a robot. For instance, such simple question can be mathematic question, such as 1+1.

At S240, if the provided answer is incorrect, at the Step S250, the call-blocking circuit determines whether the number that the caller enters the incorrect answer has exceeded a predetermined number. If it has not exceeded the predetermined number, the system will proceed to Step S230 for the user to reenter the password. Otherwise, the system will proceed to Step S270, disconnecting the call and sending to notification to the user. Further a password may have limited duration in either limited time or/and limited counts of access. If the password usage has exceeded the limited counts of access, the system will also directly proceed to Step S270 to disconnect he call and sending notification to the user.

Figure 8:
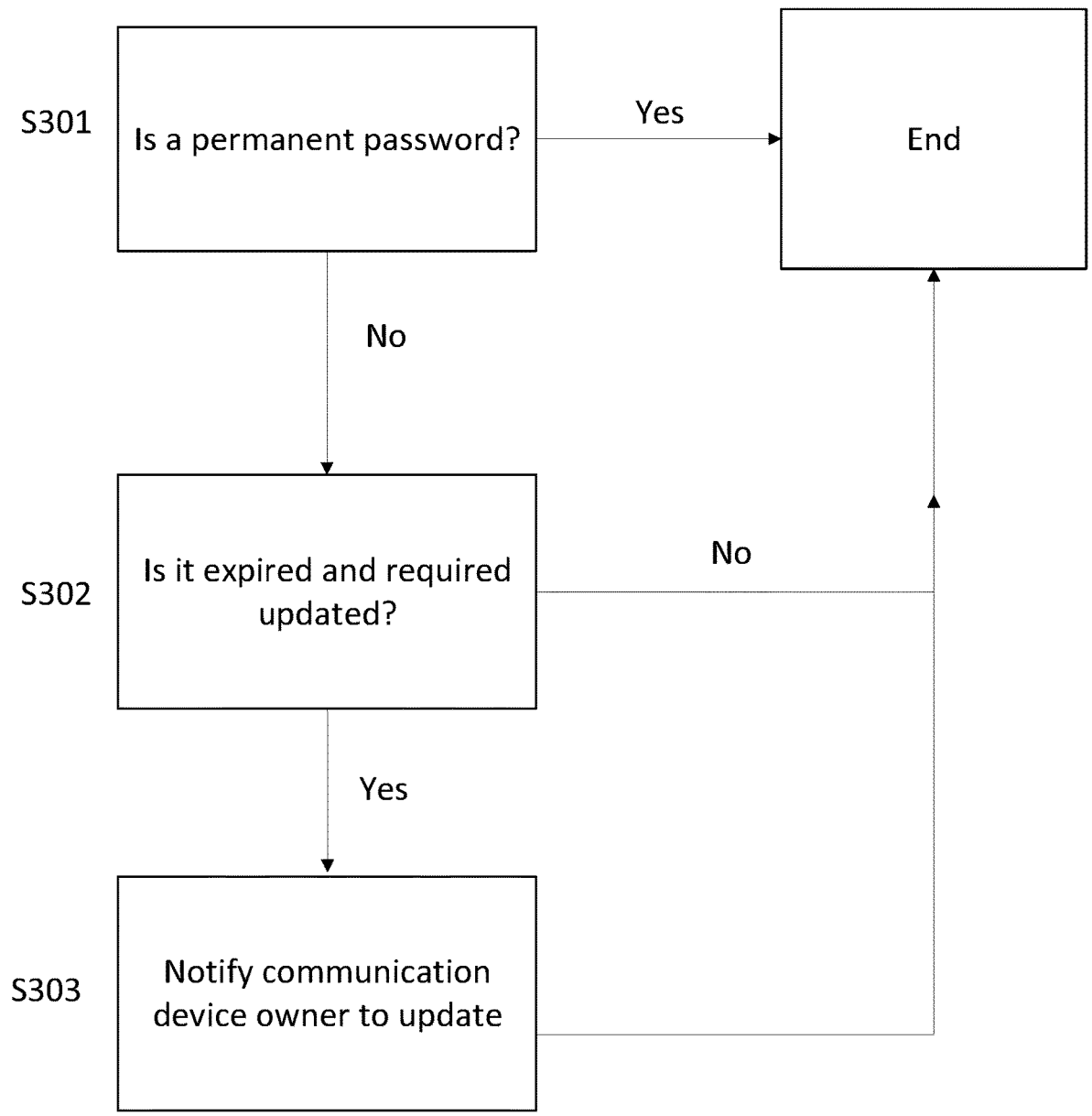
FIG. 8 is flow chart for password updating for the instant invention.

Referring to FIG. 8, a flowchart for updating the password. The process in the FIG. 8 is executed as a scheduled task on the system. At Step S301, the trivial-question circuit reviews whether each of the passwords is permanent. At Step S302, for each of the non-permanent passwords, the circuit determines whether it needs to be updated. If the password is expired, at Step S303, the system notifies the communication device to update the password.

A permanent password can be assigned to each of the contact in the phone book. A limited duration password can be assigned to either a group of contacts or unfamiliar caller in general public.

As described, in the method, system and device for permitting unfamiliar call to a mobile communication device or a communication server, the unfamiliar calls determined by the call-blocking apps or services can be further screened, such that unexpected callers will be blocked from bothering users of the device or the users, but valuable callers would be permitted through the specific interrogation process. Since the passwords for permitting the unfamiliar calls utilizes a preset trivial are preset by the user of the communication device, thus the unfamiliar callers to be permitted can be determined or selected in advance through revealing the passwords to the specific persons or party.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A communication device, comprising:
a call-blocking circuit, for determining whether an incoming call to a callee is an unfamiliar call;
a memory, for storing a password-correlated table and a familiar-call-list table; and
a trivial-question circuit;
wherein said call-blocking circuit forwards said incoming call to said trivial-question circuit when said incoming call is determined as required entering an answer according to said familiar-call-list table; and
wherein said trivial-question circuit asks a caller of said incoming call to provide said answer for a trivial question, and said trivial-question circuit connects said incoming call when said answer matches at least one password in said password-correlated table; and
wherein said call-blocking circuit generates and forwards a blocking notification message containing a number of said incoming call to the callee if said incoming call is disconnected; and wherein said call-blocking circuit connects said incoming call when said caller enters a previous password for a first time after said at least one password is updated or expired.

2. The communication device of claim 1, wherein said at least one password is a voice message with specific wording.

3. The communication device of claim 1, wherein said at least one password is a combination of dial tones.

4. The communication device of claim 1, wherein said trivial question is a voice message.

5. The communication device of claim 1, wherein said call-blocking circuit determines whether said incoming call is familiar or unfamiliar according to a call information.

6. The communication device of claim 5, wherein said call-blocking circuit connects said incoming call, disconnects said incoming call, or forwards said incoming call to said trivial-question circuit according to said call information.

7. The communication device of claim 1, wherein a call information in said call-list table contains address book or records of incoming calls.

8. The communication device of claim 1, wherein said call-list table contains a first phone book entry, and said at least one password and said at least one trivial question are permanent valid for said first phone book entry.

9. The communication device of claim 8, wherein said trivial-question circuit asks said at least one trivial question when said incoming call is not in said first phone book entry.

10. The communication device of claim 1, wherein said call-blocking circuit disconnects said incoming call after a predetermined number of failed attempts on entering said answer.

11. The communication device of claim 1, wherein said communication device is a mobile phone, a desk-top phone set, or a network server.

12. A communication device, comprising:
a call-blocking circuit, for determining whether an incoming call is an unfamiliar call;
a memory, for storing a password-correlated table and a familiar-call-list table; and
a trivial-question circuit;
wherein said call-blocking circuit forwards said incoming call to said trivial-question circuit when said incoming call is determined as required entering an answer according to said familiar-call-list table; and
wherein said trivial-question circuit asks a caller of said incoming call to provide said answer for a trivial question, and said trivial-question circuit connects said incoming call when said answer matches at least one password in said password-correlated table;
wherein said at least one password expires after a predetermined duration;
wherein said trivial-question circuit connects said incoming call without asking said at least one trivial question when said incoming call is identified as from an emergency agency;
wherein said trivial-question circuit asks said at least one trivial question when said incoming call is not recognized according to a call information; and
wherein said call-blocking circuit connects said incoming call when said caller enters a previous password for a first time after said at least one password is updated or expired.

13. The communication device of claim 12, wherein said call-blocking circuit holds said incoming call for a predetermined period of time before connecting said incoming call.

14. The communication device of claim 13, wherein said call-blocking circuit asks said caller a simple question during said predetermined period of time before connecting said incoming call.

15. The communication device of claim 14, wherein said simple question is a mathematical question.

16. The communication device of claim 12, said at least one password is restored back to said previous password if said incoming call is picked up.

17. A communication device, comprising:
  a call-blocking circuit, for determining whether an incoming call is an unfamiliar call;
  a memory, for storing a password-correlated table and a familiar-call-list table; and
  a trivial-question circuit;
  wherein said call-blocking circuit forwards said incoming call to said trivial-question circuit when said incoming call is determined as required entering an answer according to said familiar-call-list table; and
  wherein said trivial-question circuit asks a caller of said incoming call to provide said answer for a trivial question, and said trivial-question circuit connects said incoming call when said answer matches at least one password in said password-correlated table; and
  wherein said call-blocking circuit connects said incoming call when said caller enters a previous password for a first time after said at least one password is updated or expired.

* * * * *